(12) United States Patent
Perez et al.

(10) Patent No.: US 7,601,328 B2
(45) Date of Patent: Oct. 13, 2009

(54) COLLOIDAL HYDROXIDE AQUEOUS SUSPENSION OF AT LEAST ONE TRANSITION ELEMENT SERVING TO REDUCE CHROME IN CEMENT

(75) Inventors: Jean-Philippe Perez, Orleans (FR); Olivier Malbault, Boutigny sur Essonne (FR); Martin Mosquet, Bourgoin-Jallieu (FR)

(73) Assignee: Chryso, Issy les Moulineaux (FR)

( * ) Notice: Subject to any disclaimer, the term of this patent is extended or adjusted under 35 U.S.C. 154(b) by 48 days.

(21) Appl. No.: 10/595,086

(22) PCT Filed: Aug. 6, 2004

(86) PCT No.: PCT/FR2004/002098

§ 371 (c)(1),
(2), (4) Date: Mar. 30, 2006

(87) PCT Pub. No.: WO2005/016843

PCT Pub. Date: Feb. 24, 2005

(65) Prior Publication Data

US 2006/0213400 A1    Sep. 28, 2006

(30) Foreign Application Priority Data

Aug. 8, 2003    (FR) .................... 03 09755

(51) Int. Cl.
    *C01G 17/02* (2006.01)
(52) U.S. Cl. ...................... 423/618; 106/733
(58) Field of Classification Search .......... 423/618; 106/733
See application file for complete search history.

(56) References Cited

U.S. PATENT DOCUMENTS 4,019,994 A    4/1977   Kelly
4,057,616 A *  11/1977  Wolfangel ............... 424/1.29
4,418,131 A    11/1983  Evans
4,913,890 A *  4/1990   Arndt et al. ............. 423/633
6,133,347 A    10/2000  Vickers et al.

FOREIGN PATENT DOCUMENTS

| DE | 29915326 | 7/2000 |
|----|----------|--------|
| EP | 0960865  | 12/1999 |
| EP | 1251111  | 10/2002 |
| JP | 06100343 | 4/1994 |
| WO | 91/15435 | 10/1991 |
| WO | 96/40598 | 12/1996 |
| WO | 98/24734 | 6/1998 |
| WO | 00/06517 | 2/2000 |

OTHER PUBLICATIONS

Answer 44 of 56 of CA on STN JP 02169996 (Jun. 29, 1990) Minamoto et al. abstract only.*
Answer 8 of 56 of CA on STN JP 2003287908 (Oct. 10, 2003) Inno. abstract only.*
Patent Abstracts of Japan, vol. 0183, No. 71 (C-1224), Jul. 13, 1994.
International Search Report of PCT/FR04/02098, date of completion Feb. 7, 2005.

* cited by examiner

*Primary Examiner*—Paul Marcantoni
(74) *Attorney, Agent, or Firm*—Barnes & Thornburg LLP

(57) ABSTRACT

The invention relates to a hydroxide aqueous suspension of at least one selected transition element of which the potential oxidation reduction is less than that of the pair $CrO_7^{2-}/CrO_4^{2-}$ (−0.12 V) having a pH between 2 and 11, limits excluded, for reducing the content of chrome VI of cement to a value no greater than 2 ppm. The suspension is characterized in that it contains 0.5 to 80% by wt. of dry material of hydroxide of at least one transition element with regard to the quantity of water and in that it is stabilized by a hydrosoluble stabilizer. This suspension makes it possible to reduce the content of chrome VI of cements to a value no greater than 2 ppm.

17 Claims, 6 Drawing Sheets

Assay of Cr VI: Frangay cement

Quantity of tin (ppm/cement)

Ordinate: "chromium content (ppm/cement)"

COLLOIDAL HYDROXIDE AQUEOUS SUSPENSION OF AT LEAST ONE TRANSITION ELEMENT SERVING TO REDUCE CHROME IN CEMENT

BACKGROUND AND SUMMARY

The invention relates to an aqueous colloidal suspension of the hydroxide of at least one transition element and/or of tin whose oxidation-reduction potential is less than that of the $CrO_4^{2-}/Cr(OH)_3$ couple (−0.12 V) with a pH between 2 and 11, limits excluded, and containing less than 0.02% of soluble ions of at least one transition element and/or of tin in solution, the suspension being designed to reduce the chromium VI content of cement to a value at most equal to 2 ppm.

The invention more particularly relates to an aqueous suspension of tin hydroxide with an oxidation-reduction potential of −0.96 V, of iron hydroxide with an oxidation-reduction potential of −0.56 V, of manganese hydroxide with an oxidation-reduction potential of −0.4 V, implemented alone or as a mixture, with a pH between 2 and 11, limits excluded, designed to reduce the chromium VI content of cement to a value at most equal to 2 ppm, the suspension being stabilised by means of a stabilisation agent.

The invention also relates to the use of aqueous suspensions of tin hydroxide, and/or iron hydroxide and/or manganese hydroxide of pH between 2 and 11, limits excluded, designed to reduce the chromium VI content of cement during the process of preparation of the cement to form a treated cement whose chromium VI content has a value at most equal to 2 ppm.

The invention finally relates to a process for treatment of cements to reduce the chromium VI content of the cement to a value at most equal to 2 ppm.

It is known that cements contain chromium compounds which, when the cements are mixed with water, appear in the form of chromium VI dissolved in water. Now, chromium VI soluble in the water of the cements may be the origin of allergic reactions for persons who come in contact with products containing hydrosoluble compounds of hexavalent chromium. Chromium is even suspected of being carcinogenic for the human. Thus, construction workers whose skin, in general the hands and the arms, is brought in regular contact with mixtures of cement and water are capable of contracting contact eczema due to the too-elevated chromium VI content of the cements.

Systems exist in the state of the art that are designed to reduce hydrosoluble hexavalent chromium compounds in the cements. It is known for example that the addition of ferrous sulphate reduces the content of chromium dissolved in a cement-water mixture. The ferrous sulphate can, for example, be added during the preparation of mixtures containing cement or during the manufacture of the cement. Iron (II) sulphate reduces $Cr^{6+}$ to $Cr^{3+}$, which has low solubility in the cement-water mixtures. Thus, the reaction between the $Fe^{2+}$ and $Cr^{6+}$ ions takes place in aqueous medium, i.e. when the water is added to the cement containing iron (II) sulphate.

Since the nineteen-seventies, cement manufacturers have been performing a ferrous sulphate treatment in particular at the time of the grinding step in order to reduce the chromium VI content in the cements and thus limit the risks of eczema being contracted by construction workers in regular contact with cement-water mixtures. However, this ferrous sulphate treatment of cements that makes it possible to reduce the chromium VI content of the treated cements turns out to be rather ineffective and presents numerous disadvantages.

As a matter of fact, it turns out to be necessary in practice to use iron sulphate in powder form in order to obtain reduction of chromium (VI) to chromium (III) with iron (II) ions. Now, oxygen in the air can convert iron (II) to iron (III). For this reason, particular attention as well as particular implementation conditions prove indispensable.

Other reduction pathways of chromium (VI) have been developed, as for example the reduction of chromium (VI) by organic systems such as aldehydes, and heterocyclic compounds such as, for example, pyridine. But use of these organic systems in practice has proven maladapted for economic reasons connected in particular to the low stability of these organic systems in the preparations of cement or to the quantities to be used. It is known, moreover, in the state of the art that a solution of soluble $Sn^{2+}$ ions makes it possible to reduce chromium VI.

There is, therefore, in the state of the art, no aqueous suspension with a base of tin hydroxide, and/or iron hydroxide and/or manganese hydroxide of pH between 2 and 11, limits excluded, capable of reducing the chromium VI content of cement, cumulatively fulfilling the following conditions:

high stability, even in concentrated suspension, viscosity of the suspensions constant over time and which remains low, viscosity in concentrated solution sufficiently low so as to facilitate their use, formulation at a pH between 2 and 11, limits excluded, to facilitate storage, transport and conditions of implementation.

Surprisingly, it was found that an aqueous suspension of the hydroxide of at least one transition element and/or of tin, in particular of tin hydroxide and/or iron hydroxide and/or manganese hydroxide with a pH between 2 and 11, limits excluded, reduces the chromium VI content of the cement to a value at most equal to 2 ppm and is characterised in that it comprises from 0.5 to 80% by weight of dry matter of the hydroxide of at least one transition element and/or of tin, in particular of tin hydroxide, and/or iron hydroxide and/or manganese hydroxide with respect to the quantity of water, the hydroxide being implemented alone or as a mixture and in that it is stabilised by a hydrosoluble stabilisation agent.

Consequently, this invention also has for object the use of these aqueous suspensions of tin hydroxide, and/or iron hydroxide and/or manganese hydroxide of pH between 2 and 11, limits excluded, designed to reduce the chromium VI content of the cement in order to produce cements whose chromium VI content is at most equal to 2 ppm, designated below as treated cements.

This invention also relates to a process for treatment of cements to reduce the chromium VI content of the cement to a value at most equal to 2 ppm, which is characterised in that, after the step of calcination of the clinker in the cement manufacturing process, an aqueous suspension is introduced, of tin hydroxide, and/or iron hydroxide and/or manganese hydroxide with a pH between 2 and 11, limits excluded, the suspension being as previously defined, according to the invention to fabricate cements whose chrome VI content is at most equal to 2 ppm, designated below as treated cements.

This invention also concerns the use of treated cement produced according to the treatment process of the invention and of which the chromium VI content is at most equal to 2 ppm in order to prepare a concrete composition comprising treated cement, water and the customary components.

The invention relates finally to compositions of concrete comprising cement, water and the customary components and being characterised in that, at the time of the mixing of the various components an aqueous suspension of tin hydroxide of pH between 2 and 11, limits excluded, is added, as defined within the framework of the invention in a quantity sufficient to reduce the soluble chromium VI content to a value at most equal to 2 mg of Cr(VI) per kg of cement.

DETAILED DESCRIPTION

The chromium ions present the characteristic of having a strong oxidizing action. Thus, in the presence of oxidisable substances, chromium (VI) is reduced to chromium (III). The chemical reaction of oxidation-reduction which describes this mechanism is defined as the transfer of electrons from the reduced form red$_2$ of a redox couple (ox$_2$/red$_2$) to the oxidized form ox$_1$ of another redox couple (ox$_1$/red$_1$). It can take place only if the oxidation-reduction potential of the couple ox$_1$/red$_1$ is greater than the oxidation-reduction potential of the couple ox$_2$/red$_2$.

Figure 2:
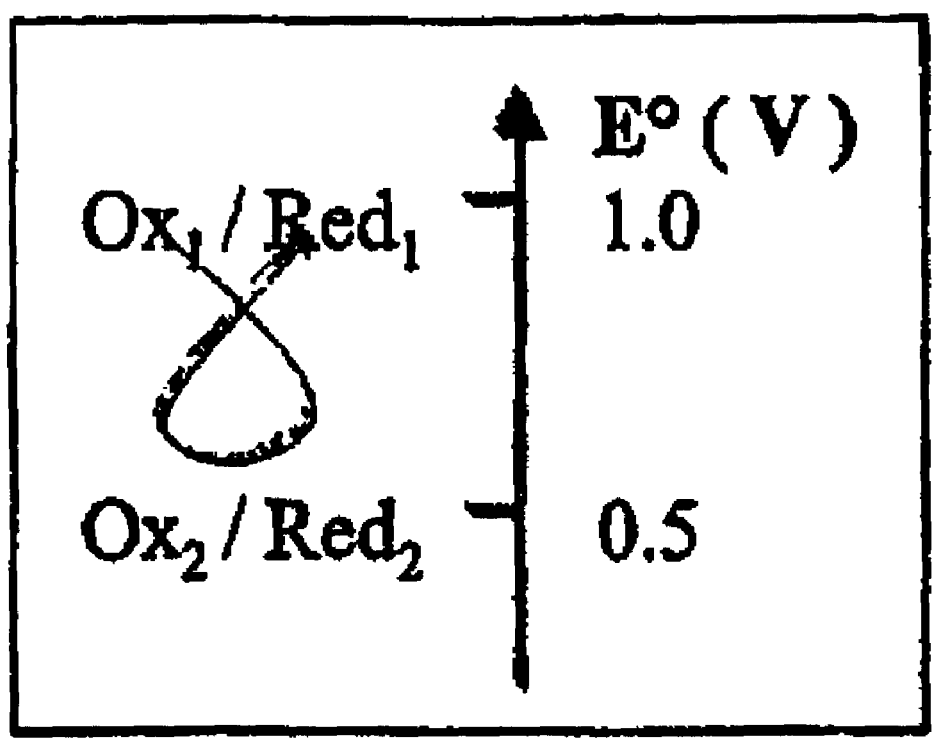
FIG. 2. Figuratively tracing the transfer of electrons from two oxidation-reduction couples, Ox1/Red1 and Ox2/Red2 diagrammed on a scale of redox potential, Eo (V), yields a shape that is similar to the Greek letter gamma and may be referred to as the "law of gamma."

When the couples are classified on a scale of redox potential, this transfer obeys a law called the law of gamma (FIG. 2).

It is then appropriate within the framework of the invention to select the redox couples involved in the case of the reduction of chromium VI in the cement. In order to do so, it appears necessary to determine in which ionic form the chromium is present in the interstitial medium of the cement so as to be able to select the couples capable of reducing chromium in the interstitial medium of the cement.

This interstitial medium of the cement presents a strongly basic pH greater than 11 and in such a medium, chromium VI is present in the $CrO_4^{2-}$ form.

Consequently, the oxidation-reduction couple involved appears to be $CrO_4^{2-}/Cr(OH)_3$ and the equation of the reduction associated with this couple is:

$$CrO_4^{2-}+4H_2O+3e^-\rightarrow Cr(OH)_3+5OH^-$$ (Equation 1)

The verified oxidation-reduction potential of the $CrO_4^{2-}/Cr(OH)_3$ couple is −0.12 V and an oxidation-reduction reaction with another ox/red couple can take place only if this other ox/red couple presents an oxidation-reduction potential less than −0.12 V.

According to the invention, in the case of the tin hydroxide selected, the $Sn(OH)_6^{2-}/Sn(OH)_4^{2-}$ couple possesses a measured oxidation-reduction potential of −0.96 V, less than that of the $CrO_4^{2-}/Cr(OH)_3$ couple which is −0.12 V.

Consequently, the ox/red couple selected observes the following oxidation-reduction equations and the corresponding transfer of electrons takes place according to the abovementioned law of gamma (FIG. 3):

$$CrO_4^{2-}+4H_2O+3e^-\rightarrow Cr(OH)_3+5OH^-$$ (Equation 2)

$$Sn(OH)_6^{2-}+2e^-\rightarrow Sn(OH)_4^{2-}+2OH^-$$ (Equation 3)

At the time of the application of the selected ox/red couple, in the interstitial medium of the cement, tin hydroxide $Sn(OH)_2$ reacts with the hydroxide ions of the medium to form the $Sn(OH)_4^{2-}$ ion according to equation 4.

$$Sn(OH)_2+2OH^-\rightarrow Sn(OH)_4^{2-}$$ (Equation 4)

The $Sn(OH)_4^{2-}$ ion is the reduced form of the $Sn(OH)_6^{2-}/Sn(OH)_4^{2-}$ couple. This ox/red couple possesses a potential of −0.96 V.

According to the law of gamma for the couples $CrO_4^{2}/Cr(OH)_3$ and $Sn(OH)_6^{2}/Sn(OH)_4^{2}$ (FIG. 3), $Sn(OH)_4^{2}$ reduces the $CrO_4^{2-}$ ion to $Cr(OH)_3$ according to the following oxidation-reduction reaction (Equation 5).

$$2CrO_4^{2-}+8H_2O+3Sn(OH)_4^{2-}\rightarrow 2Cr(OH)_3+4OH^-+3Sn(OH)_6^{2-}$$ (Equation 5)

Figure 3:
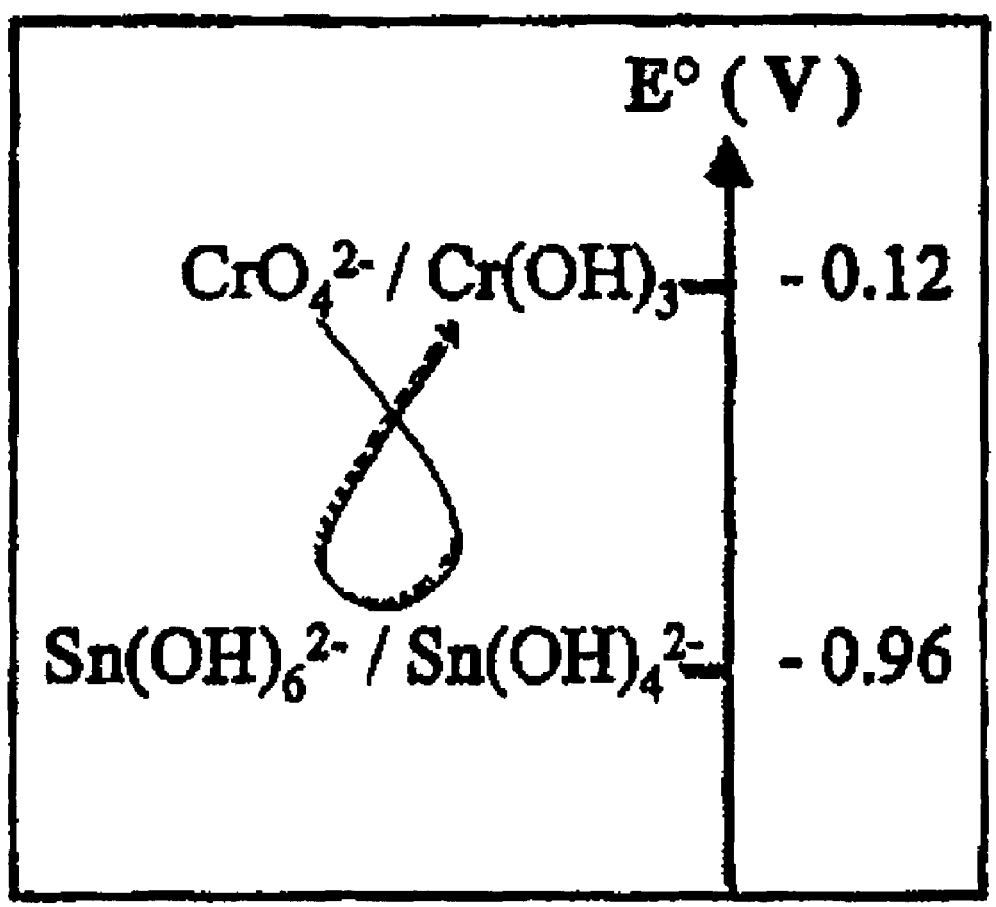
FIG. 3. A diagram showing the reduction-oxidation potential relationship of the CrO42-/Cr(OH)$_3$ redox couple (−0.12 V) and the Sn(OH)62-/Sn(OH)42- redox couple (−0.96 V).
Figure 4:
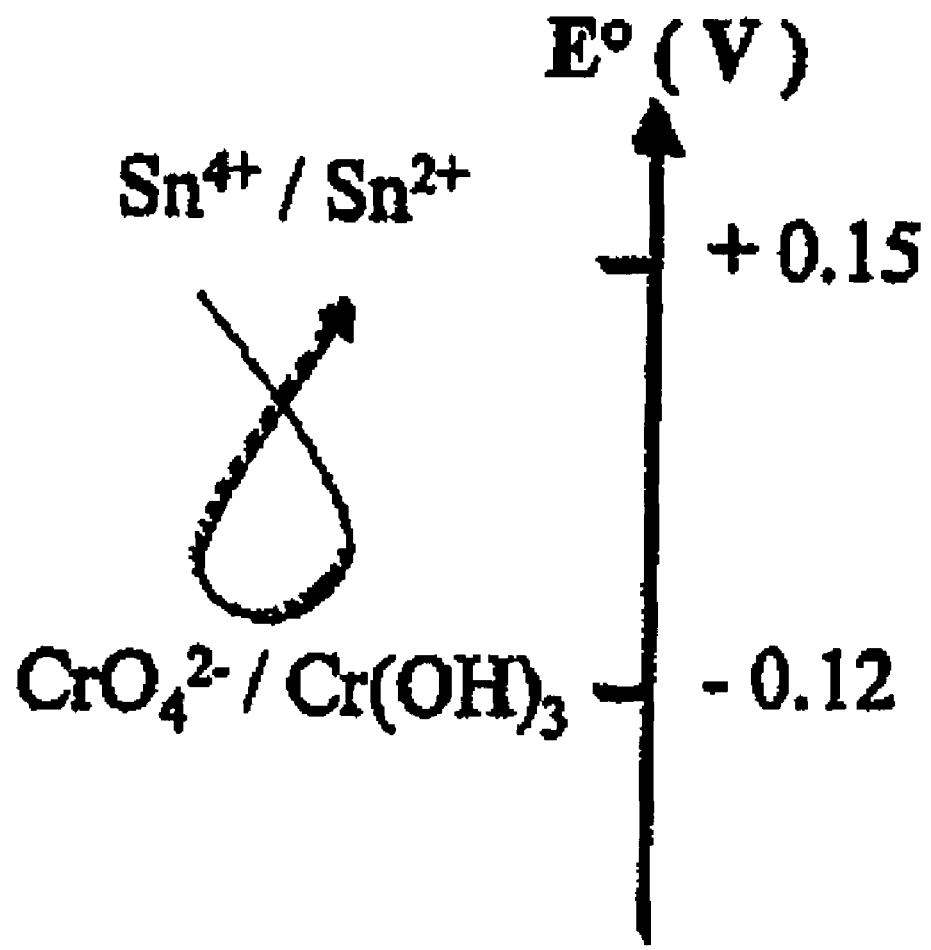
FIG. 4. A diagram showing the reduction-oxidation potential relationship of the Sn4+/Sn(+redox couple (−0.96 V) and the CrO42-/Cr(OH)$_3$ redox couple (−0.12 V).

As opposed to, and as shown in FIG. 3, the law of gamma for the $CrO_4^{2-}/Cr(OH)_3$ couple (−0.12 V), implementation of an $Sn^{4+}/Sn^{2+}$ couple of oxidation-reduction potential equal to +0.15 V appears to be unable to be used as a reducer of chrome VI in the interstitial medium of the cement: this couple in fact has an oxidation-reduction potential greater than that of the $CrO_4^{2-}/Cr(OH)_3$ couple in the scale of oxidation-reduction potentials and consequently the oxidation-reduction reaction between $Sn^{2+}$ and $CrO_4^{2}$, the species present in said interstitial medium of the cement, cannot take place as shown by FIG. 4.

According to the invention, in the case of the selection of iron hydroxide, the $Fe(OH)_3/Fe(OH)_2$ couple possesses a measured oxidation-reduction potential of −0.56 V, less than that of the $CrO_4^{2-}/Cr(OH)_3$ couple which is −0.12 V.

Figure 5:
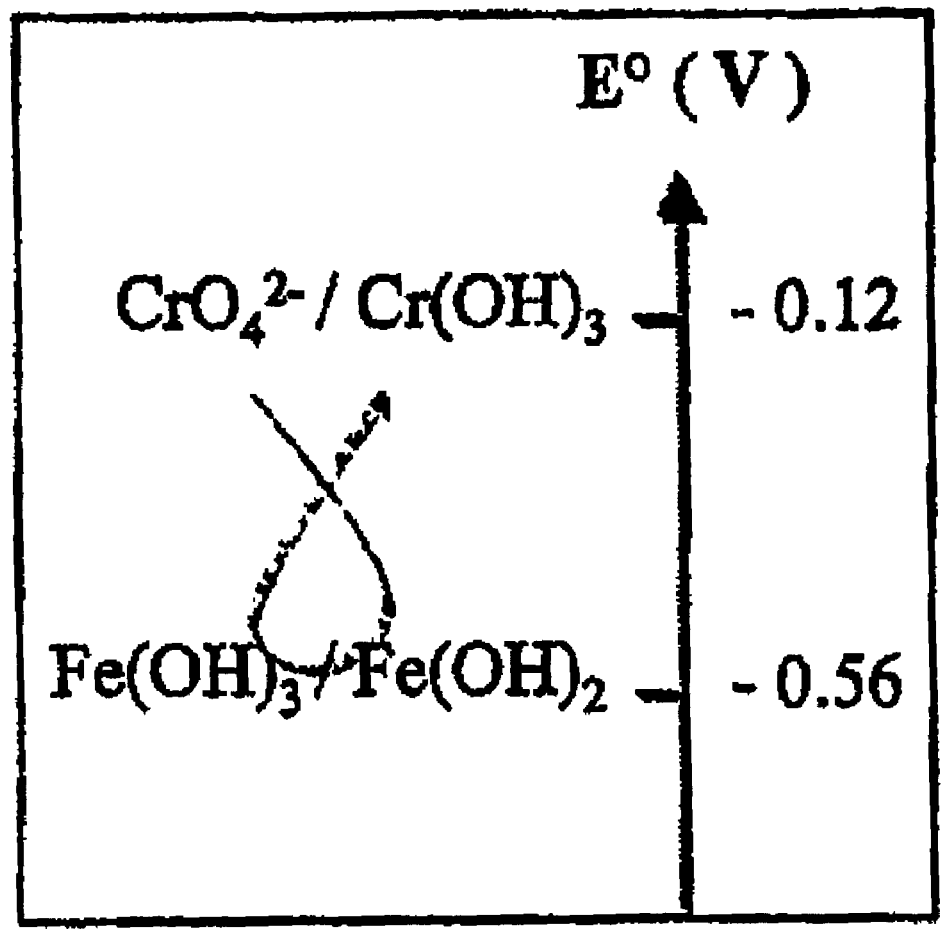
FIG. 5. A diagram showing the reduction-oxidation potential relationship of the CrO42-/Cr(OH)3 redox couple (−0.12 V) and the Fe(OH)3/Fe(OH)2 redox couple (−0.56 V).

Consequently, the oxidation-reduction equations are the following and the corresponding transfer of electrons takes place according to the following law of gamma (FIG. 5):

$$CrO_4^{2-}+4H_2O+3e^-\rightarrow Cr(OH)_3+5OH^-$$ (Equation 6)

$$Fe(OH)_3+e^-\rightarrow Fe(OH)_2+OH^-$$ (Equation 7)

During the application of the ox/red couple selected, in the interstitial medium of the cement, the $Fe(OH)_3/Fe(OH)_2$ couple reduces the $CrO_4^{2-}$ ion to $Cr(OH)_3$, according to the oxidation-reduction reaction described below (equation 8).

$$CrO_4^{2-}+4H_2O+3Fe(OH)_2\rightarrow Cr(OH)_3+2OH^-+3Fe(OH)_3$$ (Equation 8)

According to the invention, in the case of the selection of manganese hydroxide, the $Mn(OH)_3/Mn(OH)_2$ couple possesses a measured oxidation-reduction potential of −0.40 V, less than that of the $CrO_4^{2-}/Cr(OH)_3$ couple, which is equal to −0.12 V.

Figure 6:
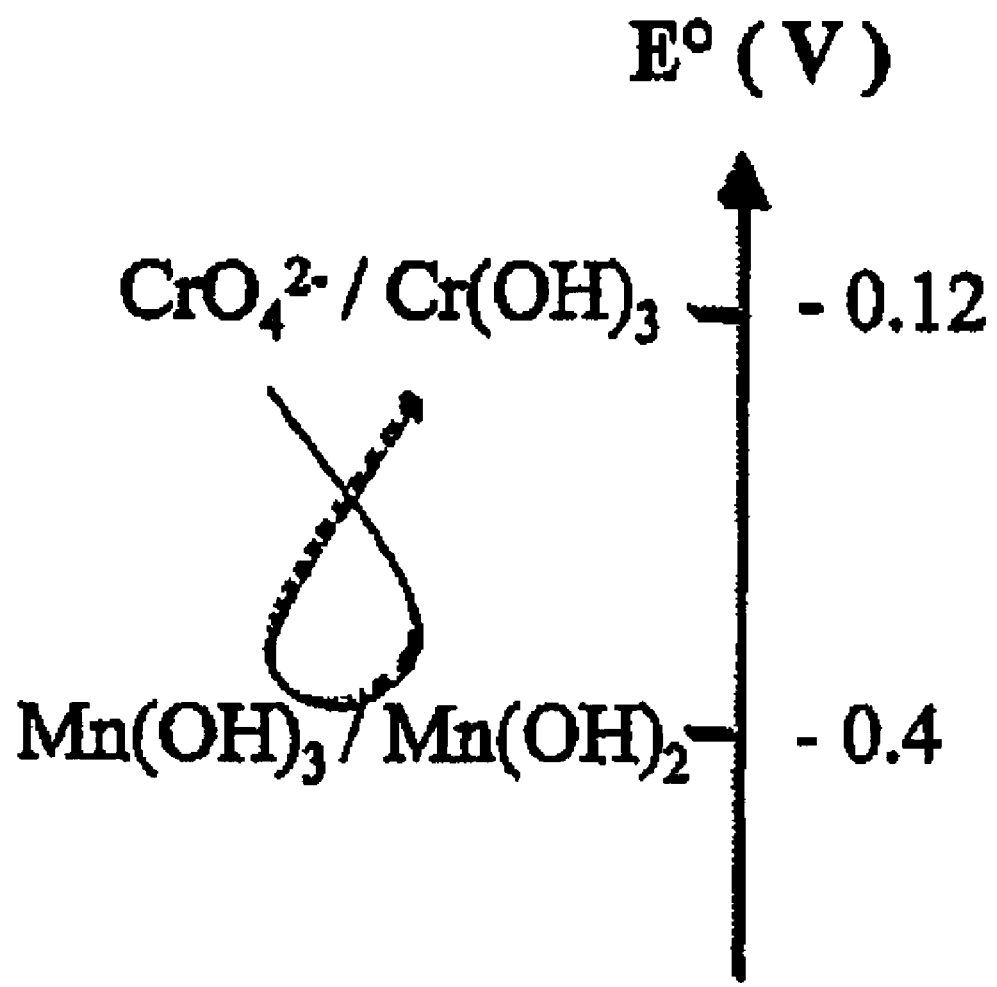
FIG. 6. A diagram showing the reduction-oxidation potential relationship of the CrO42-/Cr(OH)3 redox couple (−0.12 V) and the Mn(OH)3/Mn(OH)2 redox couple (−0.4 V).

Consequently, the oxidation-reduction equations are the following and the corresponding transfer of electrons takes place according to the law of gamma (FIG. 6):

$$CrO_4^{2-}+4H_2O+3e^-\rightarrow Cr(OH)_3+5OH^-$$ (Equation 9)

$$Mn(OH)_3+e^-\rightarrow Mn(OH)_2+OH^-$$ (Equation 10)

During the application of the selected red/ox couple in the interstitial medium of the cement, the manganese hydroxide $Mn(OH)_3/Mn(OH)_2$ reduces the $CrO_4^{2-}$ ion to $Cr(OH)_3$ according to the following oxidation-reduction reaction (equation 11).

$$CrO_4^{2-}+4H_2O+3Mn(OH)_2 \rightarrow Cr(OH)_3+2OH^-+3Fe(OH)_3 \quad \text{(Equation 11)}$$

Thus the aqueous suspension of tin hydroxide and/or iron hydroxide and/or manganese hydroxide of pH between 2 and 11, limits excluded, according to the invention is prepared, respectively, from a stannous compound, a ferrous compound, or a manganous compound in the presence of a strong base. In order to do this, a suspension of tin hydroxide can be prepared, of pH between 2 and 11, exclusive of limits, from a stannous compound and sodium hydroxide. Among the stannous compounds, it is possible to cite, by way of example, the tin chlorides, the tin sulphates and other stannous compounds routinely used and easily dissociated in aqueous media.

In the same way, a suspension of iron hydroxide can be prepared, of pH between 2 and 11, exclusive of limits, from a ferrous compound and sodium hydroxide.

Among the ferrous compounds, it is possible to cite, by way of example, the iron chlorides, the iron sulphates and other ferrous compounds routinely used and easily dissociated in aqueous media.

Finally, a suspension of manganese hydroxide can be prepared, of pH between 2 and 11, exclusive of limits, from a manganous compound and sodium hydroxide. Among the manganous compounds, it is possible to cite, by way of example, the manganese chlorides, the manganese sulphates and other manganese compounds routinely used and easily dissociated in aqueous media.

The aqueous suspension of tin hydroxide, and/or iron hydroxide and/or manganese hydroxide of pH between 2 and 11, limits excluded, thus obtained appears in the form of a colloidal suspension which tends to sediment. This is why a homogenization by stabilisation of the aqueous colloidal suspension of tin hydroxide, and/or iron hydroxide and/or manganese hydroxide of pH between 2 and 11, limits excluded, is done through implementation of a hydrosoluble stabilisation agent. This agent for stabilisation of said suspension proves to be indispensable for the production of an aqueous suspension of tin hydroxide, and/or iron hydroxide and/or manganese hydroxide, of pH between 2 and 11, limits excluded, designed to reduce the chromium VI content of the cement to a value at most equal to 2 ppm, comprising from 0.5 to 80% by weight of dry matter of tin hydroxide, and/or iron hydroxide and/or manganese hydroxide with respect to the quantity of water, so that said aqueous suspension may be used on an industrial scale.

An aqueous suspension of tin hydroxide, and/or iron hydroxide and/or manganese hydroxide as defined according to the invention may preferentially comprise from 5 to 70% by weight of dry matter of tin hydroxide, and/or iron hydroxide and/or manganese hydroxide with respect to the quantity of water, and more preferentially from 10 to 60% by weight of dry matter of tin hydroxide, and/or iron hydroxide and/or manganese hydroxide with respect to the quantity of water.

As specified previously, the suspension according to the invention is stabilised by a hydrosoluble stabilisation agent.

By hydrosoluble stabilisation agent, we understand in this exposition a hydrosoluble dispersing agent of molar mass less than 100,000 g/mol.

According to the invention, the hydrosoluble agent which is a dispersing agent, is preferentially chosen from among the polynaphthalene sulfonates, the polyoxyalkylene phosphonates, preferentially di-phosphonates and polyoxyalkylene polycarboxylates of molar mass less than 100,000 g/mol.

By way of polyoxyalkylene polycarboxylates defined as dispersing agents according to the invention, it is possible to cite, for example, copolymers of the polycarboxylic type obtained by polymerisation of a polyalkyleneglycol monoester monomer containing from 2 to 300 molecules of oxyalkylene with at least one monomer chosen from among the unsaturated monocarboxylic acids such as acrylic acid, methacrylic acid, and the unsaturated dicarboxylic acids, such as maleic anhydride. By way of examples, it is possible to cite (meth)acrylate copolymers with a polyalkylene glycol chain containing from 2 to 300 molecules of oxyalkylene, maleate copolymers with a polyalkylene glycol chain containing from 2 to 300 molecules of oxyalkylene, more preferentially (meth)acrylate copolymers with a polyalkylene glycol chain containing from 2 to 300 molecules of oxyalkylene in $C_2$-$C_3$.

By way of polyoxyalkylene phosphonates, used as dispersing agents according to the invention, it is possible to preferentially cite the polyoxyethylene di-phosphonates.

The introduction of thickeners into the aqueous suspensions in order to make possible adjustment of their viscosity is known from the state of the art. Thus, aqueous suspensions of tin hydroxide, and/or iron hydroxide and/or manganese hydroxide according to the invention may possibly include a thickening agent enabling an adjustment of viscosity.

By way of thickening agent, it is possible to cite hydrosoluble polymers of molar mass greater than $10^6$ g/mol.

By way of examples of thickening agents, it is possible to cite for example the xanthane, welan, carouba and guar gums, the celluloses and their derivatives or the polyethylenes, the polyacrylates and their derivatives of molar mass greater than $10^6$ g/mol.

Thus an aqueous suspension of tin hydroxide, and/or iron hydroxide and/or manganese hydroxide of pH between 2 and 11, limits excluded, capable of reducing the chromium VI content of the cement, presents quite cumulatively the following criteria:

high stability, even in concentrated solution, viscosity of the suspensions that is constant over time and which remains low, viscosity in concentrated solution sufficiently low so as to facilitate their use, and packaging at a pH between 2 and 11, limits excluded, to facilitate storage, transport and conditions of implementation, and more preferably packaging in compliance with standards of hygiene and safety with which cement manufacturers are confronted, in particular as regards aspects connected with the corrosive character of products at pH close to 1.

Consequently, aqueous suspensions of tin hydroxide, and/or iron hydroxide and/or manganese hydroxide of pH between 2 and 11, limits excluded, designed to reduce the chromium VI content of the cement according to the invention may be used to produce cements whose chromium VI content is at most equal to 2 ppm.

The treatment process for cements implementing aqueous suspensions of tin hydroxide of pH between 2 and 11, limits excluded, according to the invention is carried out during the cement manufacturing step in the cement factory. This treatment process consists in the introduction, after the clinker calcination step during the cement manufacturing process, of an aqueous suspension of tin hydroxide, and/or iron hydroxide and/or manganese hydroxide with a pH between 2 and 11, limits excluded, of the invention to reduce the chromium VI content of the cements to a value at most equal to 2 ppm and thus to obtain cements whose chromium VI content is at most equal to 2 ppm.

EXAMPLE 1

A suspension of tin hydroxide is prepared from a source of tin which can be tin chloride or tin sulphate according to the following protocol which comprises:

definition of the proportions between an alkaline agent which is an aqueous solution of sodium hydroxide (NaOH—N) and the tin source in order to transform this tin source into tin hydroxide [$Sn(OH)_2$];

introduction of the tin source into the aqueous solution of sodium hydroxide in a slow and regular fashion, in order to avoid dismutation of the tin.

Consequently we observe:

the appearance of a white-yellow precipitate of $Sn(OH)_2$;

a phenomenon of rapid decantation of the $Sn(OH)_2$ precipitate revealing that an aqueous suspension of said $Sn(OH)_2$ cannot be stable.

In order to create a stable suspension of tin hydroxide in its aqueous precipitation medium, a dispersing agent is implemented from a suspension of tin hydroxide of 30% concentration with respect to the quantity of water.

Three trials were made with the three dispersing agents set forth below:

$1^{st}$ trial: the dispersing agent is polynaphthalene sulfonate;

$2^{nd}$ trial: the dispersing agent is polyoxyethylene di-phosphonate;

$3^{rd}$ trial: the dispersing agent is a polycarboxylate of polyoxyethylene.

In each trial, the concentration of dispersing agent is 2% by weight with respect to the suspension of tin hydroxide at a concentration of 30%.

In the three trials thus performed, the resulting suspension of tin hydroxide manifests a certain stability since it appears with a milky appearance; however, the beginning of decantation may manifest after several hours of sitting.

These three suspensions of tin hydroxide were then treated with a thickening agent:

the first trial received Xanthane gum in the proportion of 0.4% by weight with respect to the suspension of sodium hydroxide. After this treatment, the pH of the treated suspension is 2.5;

trials 2 and 3 received a mixture of xanthane gum and polyoxyethylene of high molar mass in the proportion of 2% by weight in water. After treatment, the pH of the treated suspension is 2.5.

These three suspensions of $Sn(OH)_2$, containing the dispersing agent and a thickening agent, showed excellent stability over time: no decantation is visible after several days of sitting.

The use of such suspensions of $Sn(OH)_2$ at various concentrations makes it possible to significantly reduce the chromium VI concentration in the cements.

Figure 1:
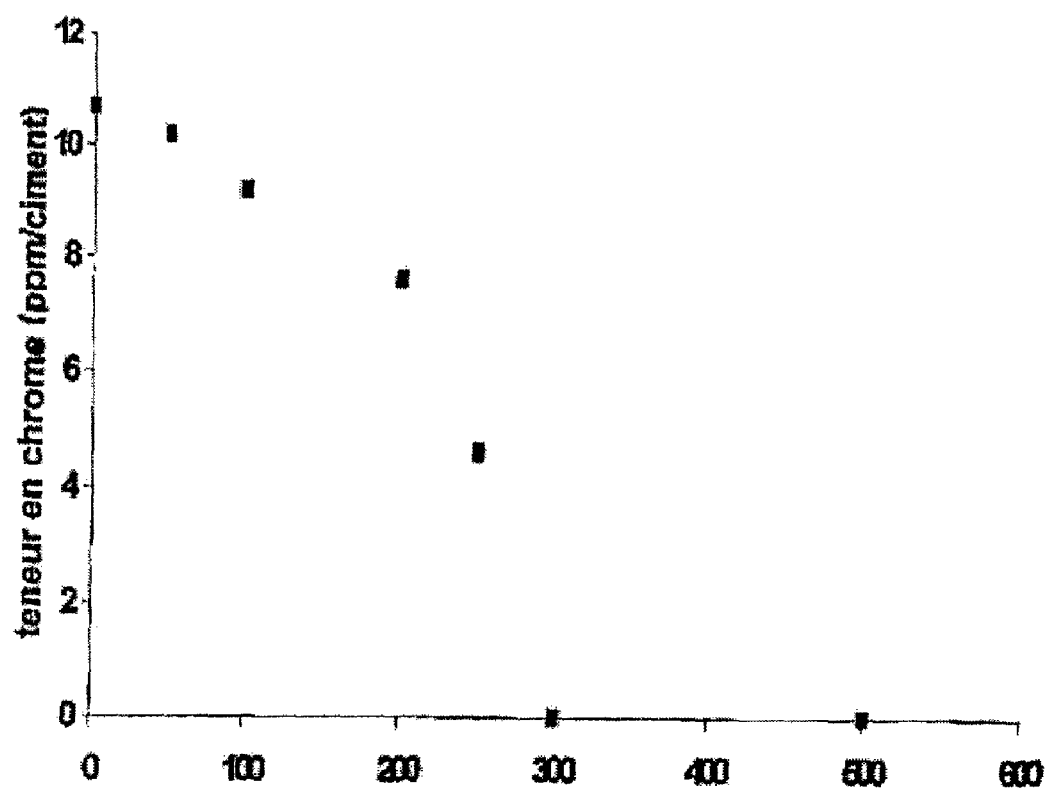
FIG. 1 The chromium ion concentration (Cr(VI) and Cr(III)) of filtrates from suspensions of ground samples of cement with no additives or with increasing concentrations of stannous ion, as measured by ICP. Cr(III) is very insoluble in water. The graph shows the decrease of soluble chromium ions as the concentration of the stannous ion is increased.

The filtrates from suspensions of cement ground, on the one hand, without additives and ground, on the other hand, while increasing the stannous concentration were analysed by ICP (Inductively Coupled Plasma) after hydration in water. The assay of total chromium is obtained by this technique, i.e. the chromium (VI) ions and the chromium (III) ions taken together, the latter being very insoluble in water. The results obtained are shown in FIG. 1.

The untreated cement presents 10.5 ppm of chromium VI ions.

After treatment of the cement by the suspension of $Sn(OH)_2$ according to the invention in the proportion of at least 300 ppm of $Sn^{2+}$, the chromium VI content of the cement is strictly less than 2 ppm.

EXAMPLE 2

A suspension of tin hydroxide is prepared from a tin source which can be tin chloride or tin sulphate according to the protocol which comprises the following steps:

definition of the proportions between an alkaline agent which is an aqueous solution of sodium hydroxide (NaOH—N) and the tin source in order to transform this tin source into tin hydroxide [$Sn(OH)_2$] and obtain an aqueous suspension of tin hydroxide charged at 15% by weight in said hydroxide, introduction of the tin source into the aqueous sodium hydroxide solution in a slow and regular fashion, in order to avoid dismutation of the tin, the appearance of a white-yellow precipitate of $Sn(OH)_2$;

the appearance of a phenomenon of rapid decantation of the $Sn(OH)_2$ precipitate showing that an aqueous suspension of said $Sn(OH)_2$ cannot be stable in this state, the creation of a stable suspension of tin hydroxide in its aqueous precipitation medium, by implementation of a dispersing agent, starting from a suspension of tin hydroxide at 15% concentration with respect to the quantity of water.

Six trials numbered 4 to 9 were conducted with:

the same reducing agent, which is tin hydroxide in suspension in water three types of dispersing agents implemented in the aqueous suspension of tin hydroxide three types of thickening agents implemented in the aqueous suspension of tin hydroxide quantities of aqueous suspensions of tin hydroxide expressed as ppm which can be different according to the trials.

These six suspensions of $Sn(oH)_2$, containing the dispersing agent and a thickening agent, showed excellent stability over time: no decantation is visible after several days of sitting.

The use of such $Sn(OH)_2$ suspensions at different concentrations makes it possible to drastically reduce the chromium VI concentration in the cements.

The filtrates from suspensions of cement ground, on the one hand, without additive and, on the other hand, ground while increasing the stannous concentration were analysed by ICP (Inductively Coupled Plasma) after hydration in water. The assay of total chromium is obtained by this technique, i.e. the chromium (VI) ions and the chromium (III) ions taken together, the latter being very insoluble in water. The operatory conditions of trials four to nine and the results obtained are brought together in table 1 below.

The untreated cement presents, according to trials four to nine, a quantity of chromium VI ions between 6 and 6.2 ppm.

After treatment of the cement by the suspensions of $Sn(OH)_2$ according to the invention in the proportion of at least 300 ppm of $Sn^{2+}$, the chromium VI content of the cement is between 0.1 and 0.2 ppm and consequently strictly less than 2 ppm.

TABLE 1

| Trial No. | Nature of reducing agent implemented in the suspension | Nature of the dispersing agent | Concentration of dispersing agent in % by weight | Nature of thickener | Concentration of thickener in % by weight | Stability of suspension | Chromium VI content of cement before treatment in ppm | Quantity of suspension introduced into cement in ppm | Chromium VI content of cement after treatment in ppm |
|---|---|---|---|---|---|---|---|---|---|
| 4 | 15% tin hydroxide | Polyacrylate | 1.4 | Xanthane gum, polyoxyethylene | 2% | Good | 6 | 3000 | 0.1 |
| 5 | 15% tin hydroxide | Polyphosphonate | 1.4 | Xanthane gum, polyoxyethylene | 2% | Good | 6 | 3000 | 0.2 |
| 6 | 15% tin hydroxide | Polyoxyethylene Polycarboxylate | 1.4 | Xanthane gum | 0.4% | Very good | 6.2 | 3000 | 0.1 |
| 7 | 15% tin hydroxide | Polyoxyethylene Polycarboxylate | 1.4 | Guar gum Tylose | 0.3% 0.2% | Very good | 6.2 | 3000 | 0.1 |
| 8 | 15% tin hydroxide | Polyoxyethylene Polycarboxylate | 1.4 | Xanthane gum | 0.4% | Very good | 6.1 | 2000 | 0.1 |
| 9 | 15% tin hydroxide | Polyoxyethylene Polycarboxylate | 1.4 | Xanthane gum | 0.4% | Very good | 6.1 | 1500 | 0.2 |

Thus treatment of the cement according to the invention appears particularly effective since the chromium VI content after treatment, which is between 0.1 and 0.2 ppm appears to always be very much less than the upper limit imposed of 2 ppm.

EXAMPLE 3

Aqueous suspensions of the hydroxides of tin, iron and manganese were prepared from sources of these various elements, which can be salts such as chlorides, sulphates or other salts, following the preparation protocol comprising the following steps:
definition of the proportions between an alkaline agent which is an aqueous solution of sodium hydroxide (NaOH—N) and the source of tin, iron, or manganese in order to transform these sources into the hydroxide of tin, iron, or manganese;
introduction of the source of tin, iron and manganese into the aqueous solution of sodium hydroxide in a slow and regular fashion, in order to avoid in particular the dismutation of the element implemented,
the appearance of a precipitate,
the appearance of a phenomenon of rapid decantation of the precipitated hydroxide showing that the aqueous hydroxide suspensions are not stable.
The creation of a stable suspension of the hydroxide of tin, iron and manganese in the aqueous precipitation medium, by implementation of a dispersing agent, from a suspension of hydroxide of concentration of 10%, 15% or 20% with respect to the quantity of water.

Three trials numbered 10, 11 and 12 were conducted with:
different reducing agents which are a mixture of tin hydroxide and iron hydroxide, of iron hydroxide alone and of manganese hydroxide alone,
the same type of dispersing agent,
the same type of thickening agent,
quantities of aqueous hydroxide suspensions expressed in ppm which are identical for these three trials.
These three suspensions of reducing agents of Cr VI containing a dispersing agent and a thickening agent, showed excellent stability over time: no decantation is visible after several days of sitting.
Use of these suspensions at various concentrations makes it possible to significantly reduce the chromium VI concentration in the cements.
The filtrates from suspensions of cement ground, on the one hand, without additive and, on the other hand, ground in the presence of the reducing agent were analysed by ICP (Inductively Coupled Plasma) after hydration in water. The assay of total chromium is obtained by this technique, i.e. chromium (VI) ions and chromium (III) ions taken together, the latter being very insoluble in water. The operatory conditions for trials 10, 11 and 12 and the results obtained are presented in table 2 below.
The untreated cement presents according to the trials between 6.1 and 6.2 ppm of chromium VI ions.
After treatment of the cement by the suspension of reducing agents according to the invention, the chromium VI content of the cement is between 0.1 and 1.2 ppm according to the trial under consideration and is consequently strictly less than the upper limit fixed at ppm not be exceeded.

TABLE 2

| Trial No. | Nature of the reducing agent implemented in the suspension | Nature of the dispersing agent | Concentration of the dispersing agent in % by weight | Nature of the thickener | Concentration of the thickener in % by weight | Suspension stability | Cr VI content of the cement before treatment in ppm | Quantity of suspension introduced into cement in ppm | Cr VI content of the cement after treatment in ppm |
|---|---|---|---|---|---|---|---|---|---|
| 10 | 10% tin hydroxide, 20% iron hydroxide | Polyoxyethylene polycarboxylate | 1.4 | Xanthane gum | 0.4% | Good | 6.2 | 3000 | 0.1 |

TABLE 2-continued

| Trial No. | Nature of the reducing agent implemented in the suspension | Nature of the dispersing agent | Concentration of the dispersing agent in % by weight | Nature of the thickener | Concentration of the thickener in % by weight | Suspension stability | Cr VI content of the cement before treatment in ppm | Quantity of suspension introduced into cement in ppm | Cr VI content of the cement after treatment in ppm |
|---|---|---|---|---|---|---|---|---|---|
| 11 | 20% Iron hydroxide | Polyoxyethylene polycarboxylate | 1.4 | Xamthane gum | 0.4% | Very good | 6.1 | 3000 | 0.1 |
| 12 | 15% manganese hydroxide | Polyoxyethylene polycarboxylate | 1.4 | Xamthane gum | 0.4% | Very good | 6.1 | 3000 | 1.2 |

Thus treatment of the cement according to the invention appears particularly effective since the chromium VI content after treatment which is between 0.1 and 1.2 ppm appears to always be less than the imposed upper limit of 2 ppm.

The invention claimed is:

1. An aqueous suspension of tin hydroxide with a pH between 2 and 11, limits excluded, to reduce chromium VI content of cement to a value at most equal to 2 ppm, includes from 0.5 to 80% by weight of dry matter of tin hydroxide with respect to the quantity of water and is stabilised by a hydrosoluble stabilisation agent.

2. The aqueous suspension of tin hydroxide as claimed in claim 1, comprising from 5 to 70% by weight of dry matter of tin hydroxide with respect to the quantity of water.

3. The aqueous suspension of tin hydroxide as claimed in claim 2, comprising from 10 to 60% by weight or dry matter of tin hydroxide with respect to the quantity of water.

4. The aqueous suspension of tin hydroxide as in claim 1, wherein the hydrosoluble stabilisation agent is a dispersing agent of molar mass less than 100,000 g/mol.

5. The aqueous suspension of tin hydroxide as in claim 4, wherein the dispersing agent is selected from the group consisting of polynaphthalene sulfonates, polyoxyalkylene di-phosphonates, polyoxyalkylene polycarboxylates and combinations thereof.

6. The aqueous suspension of tin hydroxide as in claim 5, wherein the dispersing agent is selected from the polynaphthalene sulfonates of molar mass less than 100,000 g/mol.

7. The aqueous suspension of tin hydroxide as in claim 5, wherein the dispersing agent is selected from the group consisting of copolymers of the polycarboxylic type obtained by polymerisation of a polyalkyleneglycol monoester monomer containing from 2 to 300 molecules of oxyalkylene with at least one monomer selected from the group consisting of the unsaturated monocarboxylic acids and unsaturated dicarboxylic acids.

8. The aqueous suspension of tin hydroxide as in claim 7, wherein the dispersing agent is selected from the group consisting of (meth)acrylate copolymers comprising a polyoxyalkylene polyalkylene glycol chain containing from 2 to 300 molecules of oxyalkylene.

9. The aqueous suspension of tin hydroxide as in claim 5, wherein the dispersing agent is selected from the group consisting of the polyoxyethylene di-phosphonates.

10. The aqueous suspension of tin hydroxide as in claim 1, further comprising an agent for adjusting the viscosity of said suspension.

11. The aqueous suspension of tin hydroxide as in claim 10, wherein the agent for adjusting the viscosity is selected from the group consisting of hydrosoluble polymers of molar mass greater than $10^6$ g/mol.

12. The aqueous suspension of tin hydroxide as in claim 11, wherein the agent for adjusting the viscosity is selected from the group consisting of xanthane gum, welan gum, carouba gum, guar gum, celluloses, cellulose derivatives and combinations thereof.

13. The aqueous suspension of tin hydroxide as in claim 11, wherein the agent for adjusting the viscosity is a hydrosoluble polymer of molar mass greater than $10^6$ g/mol selected from the group consisting of polyethylenes, polyethylene derivatives, polyacrylates, polyacrylate derivatives, and combinations thereof.

14. A process for treatment of cements comprising the steps of: after the clinker calcination step during the cement preparation process introducing an aqueous suspension of the hydroxide of at least one transition element or of tin whose oxidation-reduction potential is less than that of the $CO_4^{2-}/Cr(OH)_3$ couple, with a pH between 2 and 11, limits excluded, capable of reducing chromium VI content of the cements to a value at most equal to 2 ppm, comprising 0.5 to 80% by weight of dry matter of hydroxide of at least one transition element or of tin with respect to the quantity of water soluble stabilisation agent and whereby are obtained cements whose chromium VI content is at most equal to 2 ppm.

15. The process for treatment of cements as in claim 14, wherein the hydroxide is tin hydroxide.

16. A process for the treatment of cements using an aqueous suspensions of the hydroxide of at least one transition element or of tin whose oxidation-reduction potential is less than that of the $CrO_4^2/Cr(OH)_3$ couple with a pH between 2 and 11, limits excluded, designed to reduce the chromium VI content of cement comprising 0.5 to 80% by weight of dry matter of hydroxide of at least one transition element or of tin with respect to the quantity of water stabilized by a water soluble stabilisation agent to produce cements whose chromium VI content is at most equal to 2 ppm.

17. The process for the treatment of cements according to claim 16, wherein the hydroxide suspension is a tin hydroxide suspension.

* * * * *